United States Patent [19]
Pearlman et al.

[11] Patent Number: 5,764,807
[45] Date of Patent: Jun. 9, 1998

[54] DATA COMPRESSION USING SET PARTITIONING IN HIERARCHICAL TREES

[75] Inventors: William Abraham Pearlman, Niskayuna, N.Y.; Amir Said, Campinas, Brazil

[73] Assignee: PrimaComp, Inc., Troy, N.Y.

[21] Appl. No.: 527,863

[22] Filed: Sep. 14, 1995

[51] Int. Cl.$^6$ ................................................. G06T 9/40
[52] U.S. Cl. ................................................. 382/240; 348/398
[58] Field of Search .................... 382/240; 348/397, 348/398, 408, 437, 438; 341/79

[56] References Cited

U.S. PATENT DOCUMENTS

| | | | |
|---|---|---|---|
| 5,216,423 | 6/1993 | Mukherjee | 341/79 |
| 5,315,670 | 5/1994 | Shapiro | 382/240 |
| 5,321,776 | 6/1994 | Shapiro | 382/56 |
| 5,412,741 | 5/1995 | Shapiro | 382/232 |
| 5,563,960 | 10/1996 | Shapiro | 382/240 |

OTHER PUBLICATIONS

Said et al., Image Compression Using the Spatial-Orientation Tree, May 1993, pp. 279–282.
Said, A. & Pearlman, W.A., "Image Compression Using the Spatial-Orientation Tree," IEEE Int. Symp. on Circuits and Systems, vol. 1, May 1993, pp. 279–282.

*Primary Examiner*—Leo H. Boudreau
*Assistant Examiner*—Timothy M. Johnson
*Attorney, Agent, or Firm*—Raymond H. J. Powell, Jr.

[57] ABSTRACT

A data compression technique includes a subband decomposition of a source image followed by coding of the coefficients of the resultant subband decomposition for storage and/or transmission. During coding, three ordered lists are used comprising a list of significant pixels (LSP), a list of insignificant pixels (LIP) and a list of insignificant sets of pixels (LIS). The pixels in the LIP are tested, and those that are significant at a current quantization level are moved to the LSP. Similarly, sets are sequentially evaluated following the LIS order, and when a set is found to be significant it is removed from the LIS and partitioned into new subsets. The new subsets with more than one element are added back to the end of the LIS, while the single-coordinate sets are added to the end of the LIP or to the end of the LSP, depending whether they are insignificant or significant, respectively.

13 Claims, 9 Drawing Sheets

DATA COMPRESSION USING SET PARTITIONING IN HIERARCHICAL TREES

TECHNICAL FIELD

The present invention relates in general to data compression techniques. More specifically, the present invention relates to a data compression technique using hierarchical subband decomposition of a data set and set partitioning of data points within the hierarchical subband decomposition using hierarchical trees.

BACKGROUND OF THE INVENTION

As the amount of information processed electronically increases, the requirement for information storage and transmission increases as well. Certain categories of digitally processed information involve large amounts of data which translates into large memory requirements for storage and large bandwidth requirements for transmission. Accordingly, such storage and/or transmission can become expensive in terms of system resource utilization which directly translates into economic expense.

Many data compression techniques have been employed to decrease the amount of data required to represent certain digitized information. For example, compression techniques have been applied to the data associated with a bit-mapped image. One prior data compression technique devoted to image data is the ISO/JPEG (International Standards Organization/Joint Photographic Experts Group) data compression standard. Although the ISO/JPEG technique has been adopted as an industry standard, its performance is not optimal.

Recently, techniques using hierarchical subband decomposition, also known as wavelet transforms, have emerged. These techniques achieve a hierarchical multiscale representation of a source image. However, once subband decomposition of a source image has been performed, the succeeding techniques of coding the resultant data for transmission and/or storage have yet to be fully optimized. Specifically, for example, both the computational efficiency and coding efficiency of the prior techniques may be further improved. One prior technique has been disclosed by A. Said and W. Pearlman in "Image Compression Using the Spatial-Orientation Tree," IEEE Int. Symp. on Circuits and Systems, Vol. 1, pp. 279–282, May 1993, which is incorporated herein by reference in its entirety.

The present invention is directed toward optimizing the coding of a subband decomposition of an image for transmission and/or storage.

DISCLOSURE OF THE INVENTION

Briefly summarized, in a first aspect, the present invention includes a method for use in encoding and decoding a subband decomposition of a data set. The method comprises creating a list of insignificant sets of points (referred to herein as the list of insignificant sets—"LIS"), wherein each set of the LIS is designated by a root node within the subband decomposition and has a corresponding tree structure of points within the subband decomposition. The tree structure is organized as points comprising descendants and offspring of the root node, wherein a first generation of the descendants comprises the offspring.

The method further includes evaluating the descendants of the root node of each set of the LIS for significance, wherein a significant descendent of the descendants of the root node has a subband coefficient at least equal to a predetermined threshold. For each root node of the LIS having at least one significant descendant, descendants of the offspring of the root node are evaluated for significance, wherein a significant descendant of the offspring of the root node has a coefficient at least equal to the predetermined threshold. If the root node has at least one significant descendant of offspring, then each offspring of the root node is added to the LIS as a root node thereof.

As an enhancement, the method may include creating a list of significant pixels ("LSP"), the LSP initially comprising an empty set, and creating a list of insignificant pixels ("LIP"), the LIP comprising points from within a highest subband of the subband decomposition. Further, for each root node of the LIS having at least one significant descendant, the offspring of the root node may be evaluated for significance, wherein a significant offspring has a coefficient at least equal to the predetermined threshold. A significance value is input or output for each offspring of the root node, wherein the significance value indicates whether the offspring is significant.

Moreover, the method may include, for each significant offspring of the root node, adding the significant offspring to the LSP and outputting or inputting a sign of the coefficient of the significant offspring. For each insignificant offspring (an insignificant offspring of the root node has the coefficient less than the predetermined threshold), the method may include adding the insignificant offspring to the LIP.

In another aspect, the present invention includes a data structure in a computer memory for use in encoding and decoding a subband decomposition of data points. The data structure comprises a list of insignificant sets of points ("LIS"), a list of significant points ("LSP") and a list of insignificant points ("LIP").

As an enhancement, for each set of the LIS, the data structure may include a root node and a set type identifier. The set type identifier defines generations of descendants associated with the root node within the set of the LIS, wherein a first generation of descendants comprises offspring of the root node. Moreover, the set type identifier may comprise one of a first type identifier and a second type identifier. A first type identifier designates that the set comprises all of the descendants of the root node. A second type identifier designates that the set comprises the descendants of the root node excluding the offspring of the root node.

Yet another aspect of the present invention includes a computer program product comprising a computer useable medium having computer readable program code means therein for use in encoding and decoding a subband decomposition of a data set. Computer readable program code means are employed for causing the computer to affect the techniques disclosed herein.

To summarize, the present invention has many advantages and features associated with it. The coding scheme of the present invention used to process a subband decomposition of a data set provides a high level of compression while maintaining a high computational efficiency. The transmitted code (i.e., compressed data set) is completely embedded, so that a single file for, e.g., an image at a given code rate, can be truncated at various points and decoded to give a series of reconstructed images at lower rates. Processing may even be run to completion resulting in a near lossless (limited by the wavelet filters) compression. Further, the encoder and decoder use symmetrical techniques such that computational complexity is equivalent during both encoding and decoding. Thus, the techniques of the present invention advance the state of subband decomposition data compression techniques. The coding results are either comparable to, or surpass, previous results obtained through much more sophisticated and computationally complex methods.

BRIEF DESCRIPTION OF THE DRAWINGS

The subject matter regarded as the present invention is particularly pointed out and distinctly claimed in the concluding portion of the specification. The invention, however, both as to organization and method of practice, together with further objects and advantages thereof, may best be understood by reference to the following detailed description of a preferred embodiment and the accompanying drawings in which:

DESCRIPTION OF THE PREFERRED EMBODIMENT

Figure 1:
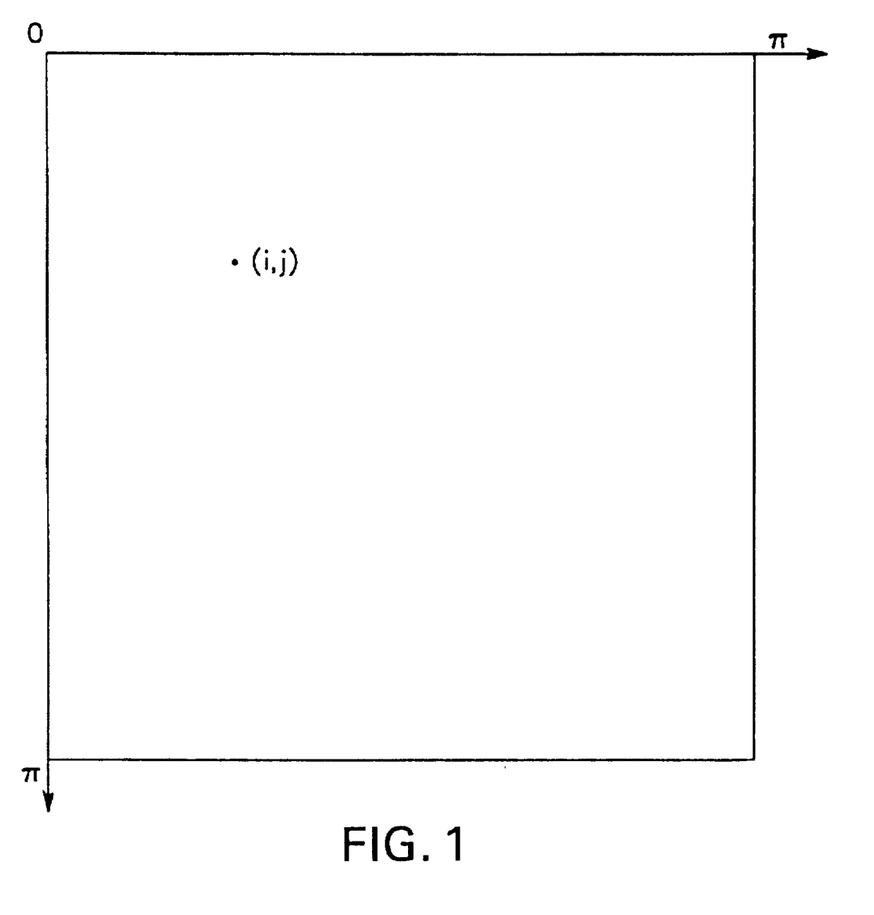
FIG. 1 is a schematic illustration of an image bitmap prior to subband decomposition.

An original image to be compressed is defined by a set of pixel values $p_{i,j}$, where (i,j) is the pixel coordinate (FIG. 1). As a first step in the compression techniques of the present invention, a subband decomposition is performed on the image resulting in a two-dimensional array $c_{i,j}$, wherein each element $c_{i,j}$ is called a transform coefficient ("coefficient") at coordinate (i,j).

Figure 2:
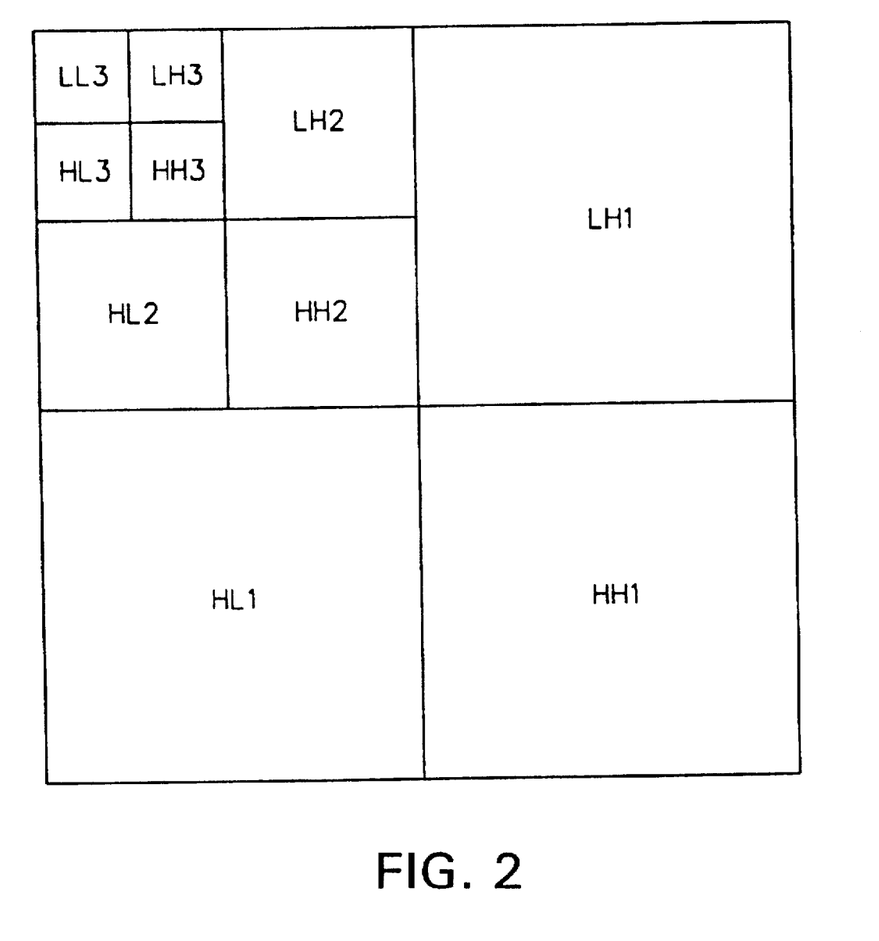
FIG. 2 is a schematic illustration of the image bitmap of FIG. 1, subsequent to subband decomposition according to an embodiment of the present invention.

In the example of FIG. 2, decomposition has been performed into 3 subbands. The designations of each subband, e.g., LH1, and subband decomposition methods will be apparent to one of ordinary skill in the art and are further described in, e.g., E. H. Adelson, E. Simoncelli, and R. Hingorani, "Orthogonal Pyramid Transforms for Image Coding," Proc. SPIE, vol 845—Visual Comm. and Image Proc. II, Cambridge, Mass., pp. 50–58, Oct. 1987, and U.S. Pat. No. 5,321,776, entitled "DATA COMPRESSION SYSTEM INCLUDING SUCCESSIVE APPROXIMATION QUANTIZER," by Shapiro, issued Jun. 14, 1994, both of which are incorporated by reference herein in their entireties.

The principles disclosed herein improve on the techniques by which the coefficients of the transformed image are transmitted such that data compression is achieved and such that efficient decompression is facilitated. Within the present invention, ordering data corresponding to the coefficients is not explicitly transmitted. Instead, the compression technique is designed such that the execution path of the coder is defined by the results of magnitude comparisons of coefficients at branching points within the execution path. So, if the encoder and decoder have the same coding algorithm, then the decoder can duplicate the encoder's execution path if it receives the results of the magnitude comparisons, and the ordering information can therefore be recovered.

The techniques disclosed herein are performed for multiple quantization levels, with each successive quantization level defining higher numerical precision and thus a higher quality image. Encoding and/or decoding may be terminated when the desired quality level has been reached. More specifically, according to the techniques of the present invention, the encoding process can be stopped at any compressed file size or let run until the compressed file is a representation of a nearly lossless image. The only limit on loss is determined by the precision of the wavelet transform filters used during subband decomposition of the source image and during reconstruction of the destination image. For perfectly reversible compression, one skilled in the art may use, e.g., an integer multiresolution transform, such as the S+P transform described in A. Said and W. A. Pearlman, "Reversible Image Compression via Multiresolution Representation and Predictive Coding," Proc. SPIE Conf. Visual Communications and Image Processing '93, Proc. SPIE 2094, pp. 664–674, Cambridge, Mass., Nov. 1993, which yields excellent reversible compression results when used with the techniques disclosed herein.

During the coding techniques of the present invention, certain operations are performed on the points (i.e., pixels) within the subband decomposition. One operation that is performed is a "significance" test. At each quantization level, determinations of "significance" are made for sets comprising both individual points and collections of points. The "significance" test is defined as follows:

$$\max\ (i,j) \in T_m \{|c_{i,j}|\} \geq 2^n?$$

In the above test, n is the current quantization level and $T_m$ is a set of pixels or a single pixel. If the comparison is negative, then all of the coefficients of the points of the set $T_m$ are less than the threshold ($2^n$), and $T_m$ is insignificant. Conversely, if the comparison is positive, then at least one of the coefficients of the set $T_m$ are greater than or equal to the threshold ($2^n$), and $T_m$ is significant.

Accordingly, a significance function may be expressed as follows:

$$S_n(T) = \begin{cases} 1, & \sum_{(i,j)\ T} \{|c_{i,j}|\} \geq 2^n, \\ 0, & \text{otherwise,} \end{cases}$$

This function indicates the significance of a set T of coordinates as a "1" if significant and a "0" if not significant (i.e., insignificant). To simplify the notation of single pixel sets, $S_n(\{(i,j)\})$ is written herein as $S_n(i,j)$.

It has been discovered that most of an image's energy is concentrated in the low frequency components. Consequently, the variance decreases as we move from the highest to the lowest levels of the subband pyramid. Furthermore, it has been observed that there is a spatial self-similarity between subbands, and the coefficients are expected to be better magnitude-ordered if we move downward in the pyramid following the same spatial orientation. For instance, large low-activity areas are expected to be identified in the highest levels of the pyramid, and they are replicated in the lower levels at the same spatial locations.

Figure 3:
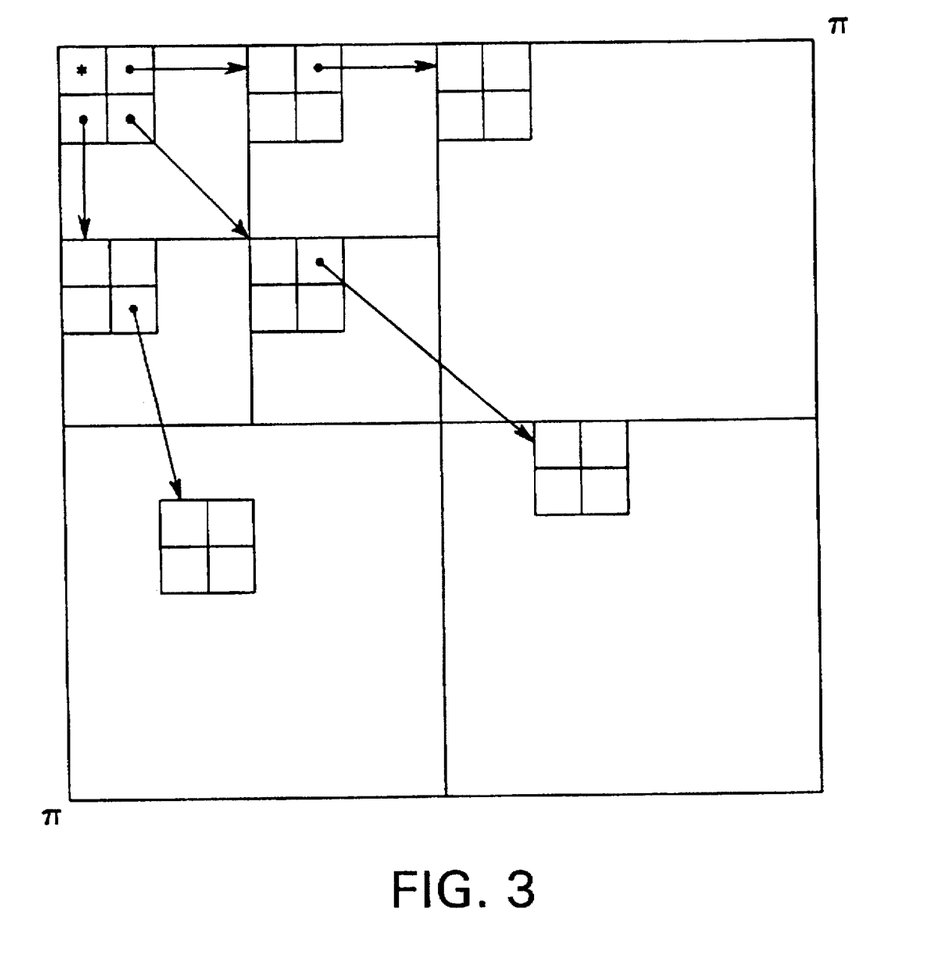
FIG. 3 is an schematic illustration of parent-child relationships within the image bitmap of FIG. 2 pursuant to one embodiment of the present invention.

According to the techniques of the present invention, a new tree structure, called a spatial orientation tree, naturally defines the above discussed spatial relationship within the hierarchical subband pyramid. For example, FIG. 3 shows how a spatial orientation tree is defined in a pyramid that is constructed with recursive four-subband splitting. Each node of the tree corresponds to a pixel, and is identified by the pixel coordinate. Its direct descendants (offspring) correspond to the pixels of the same spatial orientation in the next finer level of the pyramid. The tree is defined such that each node has either no offspring (i.e., leaves) or four offspring, which always form a group of 2×2 adjacent pixels. In FIG. 3, the arrows are oriented from each parent node to its four offspring. The pixels in the highest level of the pyramid are the tree roots and are also grouped in 2×2 adjacent pixels. However, their offspring branching rule is different, and one of them (indicated by the star—the upper left corner point in each group) has no descendants. Each of the other three in the group has a branching to a group of four in a subband of the same orientation in the same level.

Parts of the spatial orientation trees are used as partitioning subsets in the coding process. Accordingly, the following sets of coordinates are defined herein for use in connection with the techniques of the present invention:

O(i,j): set with the coordinates of all offspring (i.e., children) of node (i,j);

D(i,j): coordinates of all descendants (i.e., children and following generations) of the node (i,j);

H: coordinates of all spatial orientation tree roots (i.e., points in the highest pyramid level, e.g., LL3); and $$L(i,j)=D(i,j)-O(i,j).$$

With reference to FIG. 3, except at the highest and lowest pyramid levels, the relationship between levels comprises:

$$O(i,j)=\{(2i,2j),(2i,2j+1),(2i+1,2j),(2i+1,2j+1)\}$$

To perform the coding of the subband coefficients, three ordered list are employed. They are the list of insignificant sets of pixels ("LIS"), the list of insignificant pixels ("LIP"), and the list of significant pixels ("LSP"). In these lists, each entry is identified by a coordinate (i,j), which in the LIP and LSP represents individual pixels, and in the LIS represents either the set D(i,j) or L(i,j). To differentiate between D(i,j) and L(i,j) in the LIS, a set type identifier is included with the root node (i,j) coordinate pair and comprises a type A identifier if the set comprises D(i,j), and a type B identifier if the set comprises L(i,j).

Figure 4:
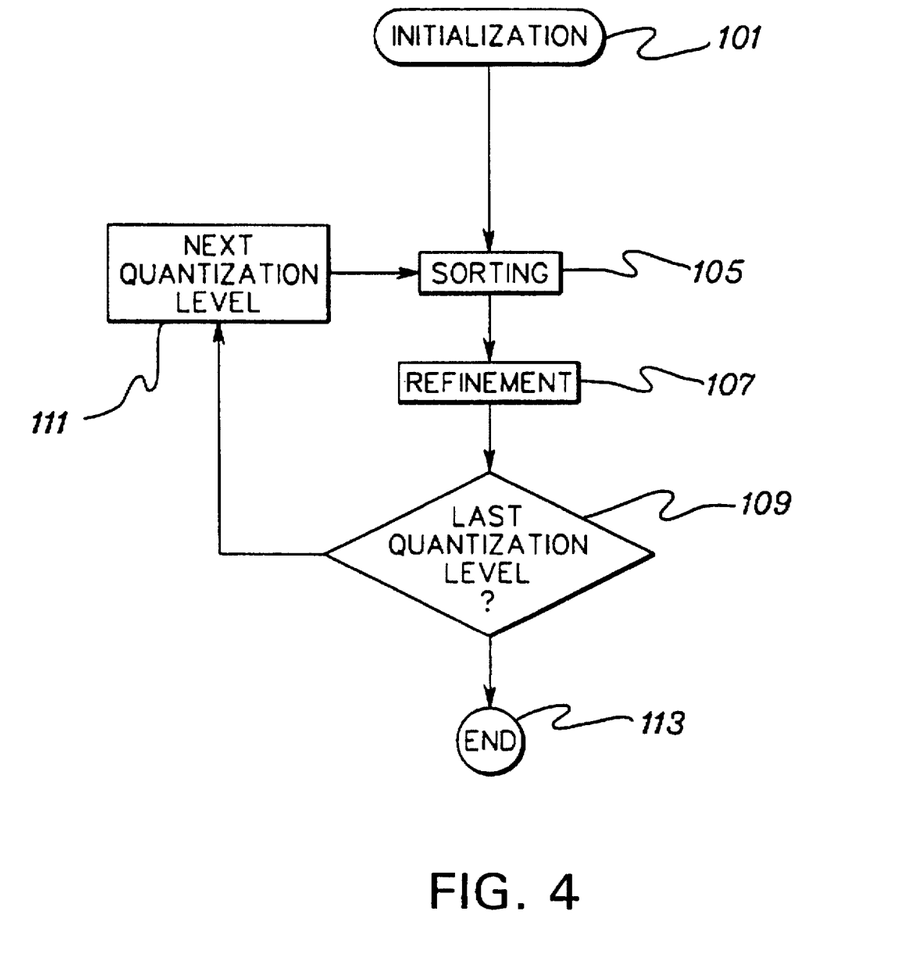
FIG. 4 is a flow diagram of the coding method of an embodiment of the present invention.

A high-level flow diagram of the coding technique of the present invention is shown in FIG. 4. Prior to beginning coding, it is assumed that a subband decomposition of a subject image has already been performed as discussed hereinabove. During initialization (101), the lists (LIS, LIP and LSP) used herein are created and the initial quantization level is determined. Thereafter, a sorting phase is entered (105). Sorting includes the processing of the lists used herein and the outputting of compressed data based upon such processing. A refinement phase (107) is entered after sorting, during which data corresponding to pixels determined to be significant during sorting of earlier quantization levels is output. A test is performed to determine if the last quantization level has been processed (109) and if not, the next quantization level is determined (111) and the method repeats staring with the sorting phase (105). After the last quantization level has been processed, data compression is completed (113).

By way of summary, with regard to the sorting phase, the pixels in the LIP are tested, and those that are significant at the current quantization level are moved to the LSP. Similarly, sets are sequentially evaluated following the LIS order, and when a set is found to be significant it is removed from the LIS and partitioned into new subsets. The new subsets with more than one element are added back to the LIS, while the single-coordinate sets are added to the end of the LIP or to the end of the LSP, depending whether they are insignificant or significant, respectively.

As discussed above, pixels in the LIP are evaluated prior to the evaluation of sets of pixels in the LIS. This ordering is established because information regarding a pixel is transmitted immediately, thus immediately reducing distortion in the received image. However, information regarding sets is used to generate new tests for sets and pixels which do not have an immediate effect on the received image. Moreover, as discussed in further detail below, if a pixel is moved to a list during set processing, information regarding the moved pixel is immediately transmitted such that distortion in the received image is immediately reduced. Throughout the techniques of the present invention, priority is given to transmitting pixel information as quickly as possible such that the received image may be quickly reconstructed.

Figure 5:
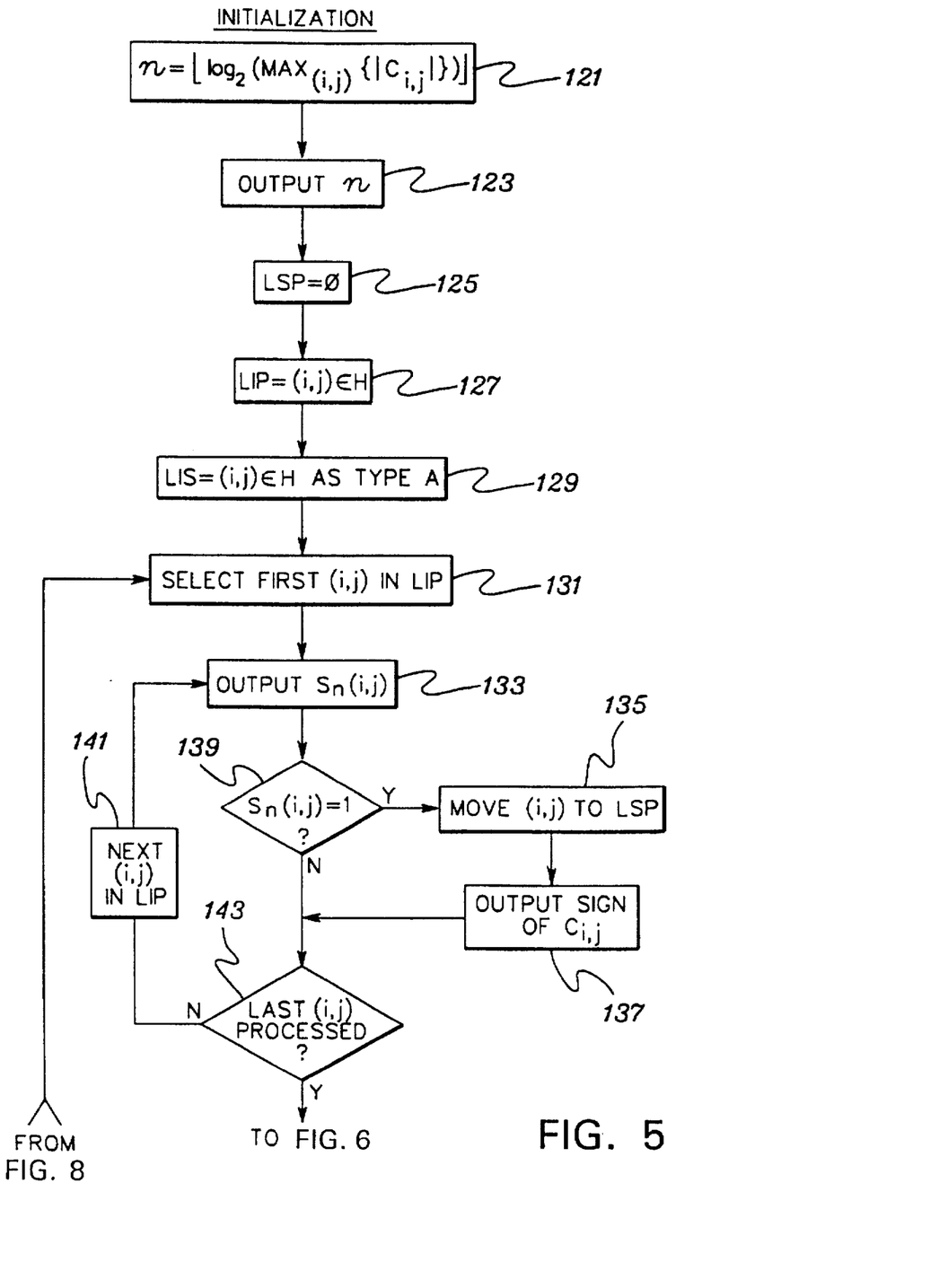
FIGS. 5–8 are more detailed flow diagrams of the coding method of FIG. 4.

The above summarized coding method is described in greater detail below in conjunction with the flow diagrams of FIGS. 5–8. A discussion of the initialization phase begins with reference to FIG. 5. An initial quantization level n is determined (121) as a function of:

$$n=\lfloor \log_2 (\max_{(i,j)}\{|c_{i,j}|\})\rfloor$$

This (n) represents the number of bits of dynamic range that are required to represent the largest coefficient of the subband decomposition of the source image. For example, if the largest value of any coefficient within the image is 234, then n would equal 7. The initial quantization level is then output into the compressed bit stream (123).

The lists used by the present invention are next initialized. Specifically, the LSP initially comprises the empty set (125). The LIP (127) includes all of the data points within the highest level LL subband H (e.g., LL3 of FIG. 2). All of the data points within the highest LL subband are also used as the initial root nodes of the LIS (129) and are designated as set type A (i.e., D(i,j)). The points in the LIP and the corresponding roots in the LIS are initially listed in the same order.

Figure 6:
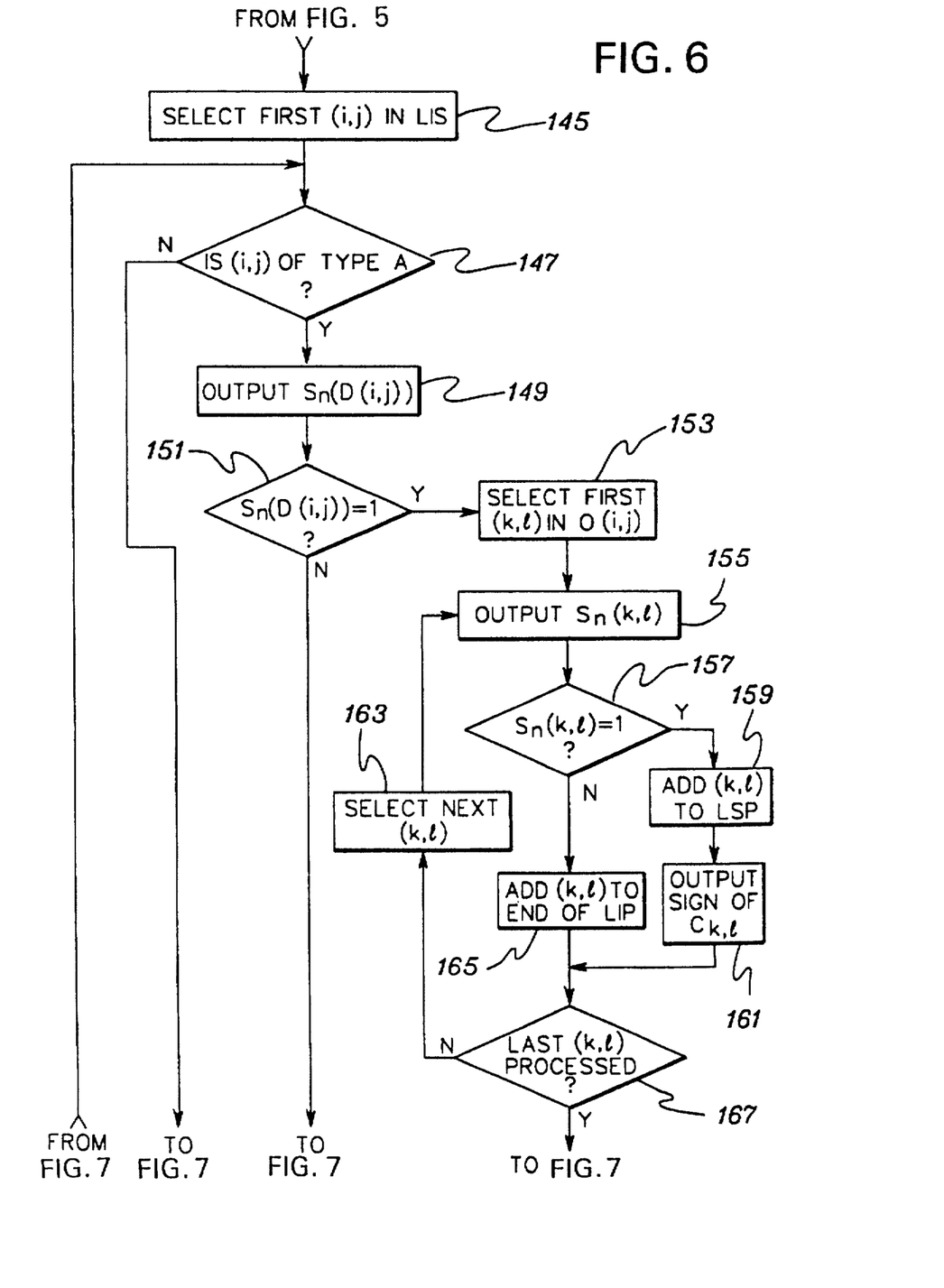

Subsequent to initialization, each pixel within the LIP is processed beginning with the first pixel (i,j) therein (FIG. 6, step 131). The significance (as discussed hereinabove) of the pixel is output into the compressed data stream (133). If the pixel is significant (139), then it is moved off of the LIP and to the LSP (135). Further, if significant, the sign of the coefficient of the pixel ($c_{i,j}$) is output into the compressed bit stream (137). Thereafter (and also if the pixel was not significant) a test is performed to determined if it was the last pixel of the LIP (143) and if not, the next pixel in the LIP is selected (141) and processing repeats (at step 133).

After the above discussed processing of the LIP is completed, processing of the LIS begins (FIG. 6). An outside loop for processing each entry within the LIS begins with the selection of the first set within the LIS as designated by its root node (i,j) (145). The set type is then tested to determine if it is a type A (147) and processing diverges based thereon.

If the set is of type A, meaning the set comprises D(i,j), the significance of D(i,j) is tested, and its significance value $S_n(D(i,j))$ is output into the compressed bit stream (149). If D(i,j) is not significant (151), then processing continues with a test to determine if all sets in the LIS have been processed (181, FIG. 7), and the selection of the next set in the LIS (179) and looping (to step 147) if processing of all sets in the LIS has not completed.

To continue, if D(i,j) is significant (151, FIG. 6), then each pixel (k,l) within o(i,j) (i.e., the offspring of (i,j)) is processed as defined by the loop which includes first (k,l) selection (153), last (k,l) processed test (167) and next (k,l) selection (163). Within this loop, $S_n(k,l)$ is output (155). If (k,l) is significant (157), then (k,l) is added to the end of the LSP (159) and the sign of $c_{k,l}$ is output (161). If (k,l) is not significant, then (k,l) is added to the LIP (165). In either case, processing within the loop continues for each (k,l) in O(i,j).

Figure 7:
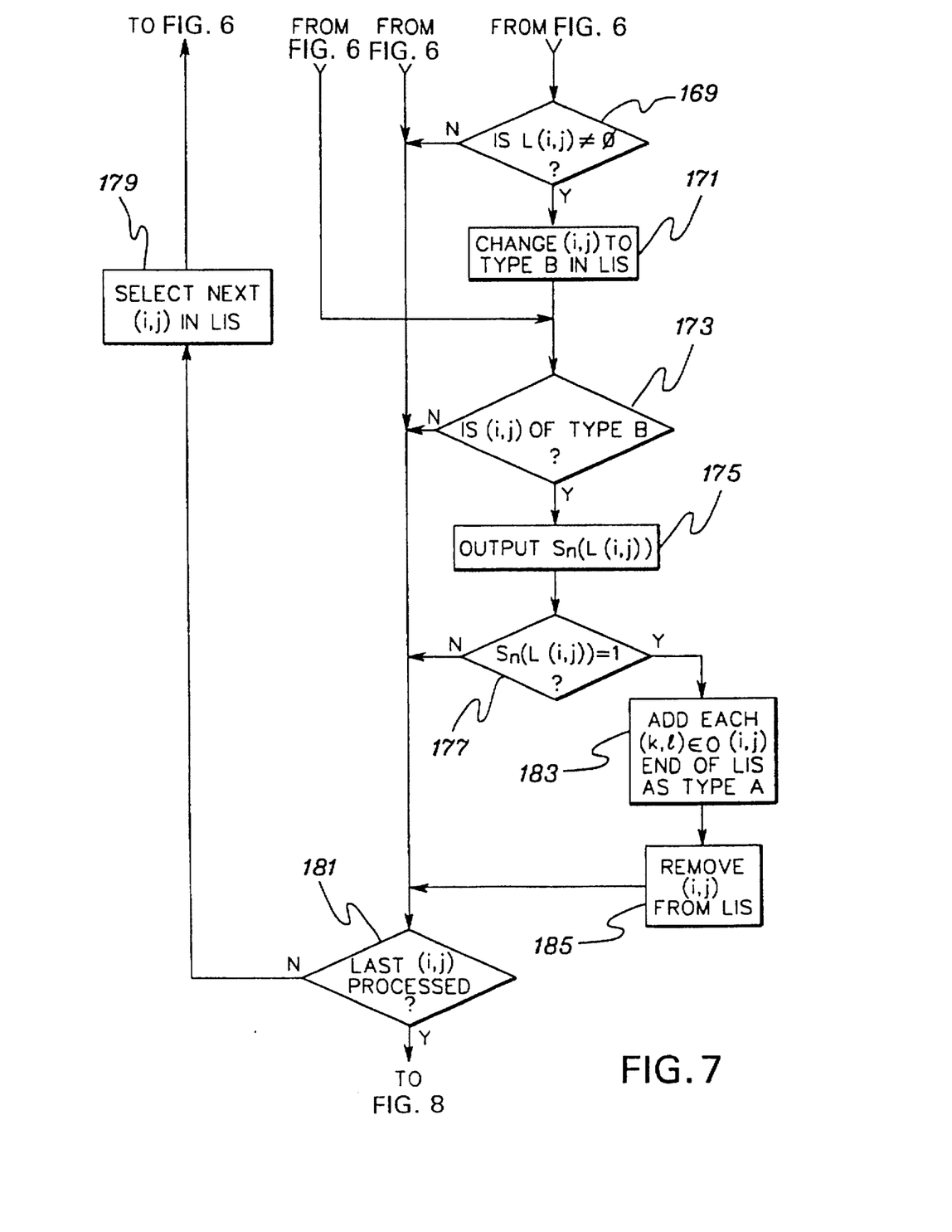

After the processing of O(i,j) is completed, a test is performed to determined whether the set L(i,j) is not empty (169, FIG. 7). If it is not empty, then the set designated by root node (i,j) in the LIS is changed to a type B set (171) and processing continues with the type B processing discussed hereinbelow. If L(i,j) comprises the empty set, then the processing of each set within the LIS continues (181).

To recall, a test was performed to determine if the current set was of set type A (147). A corresponding test is performed in the flow diagram of FIG. 7, to determine if the current set comprises a type B set (173). If the set is not of type B, then the processing of each set within the LIS continues (181, 179). However, if the current set is of type B, then $S_n(L(i,j))$ is output (175). Thereafter, if L(i,j) is significant (177), then each (k,l) within O(i,j) is added as a root node to the end of the LIS as type A (183) and the current root node (i,j) is removed from the LIS (185). (Note: each entry added to the end of the LIS (183) is evaluated before the current sorting pass ends) Processing of each set within LIS thereafter continues (181, 179).

Figure 8:
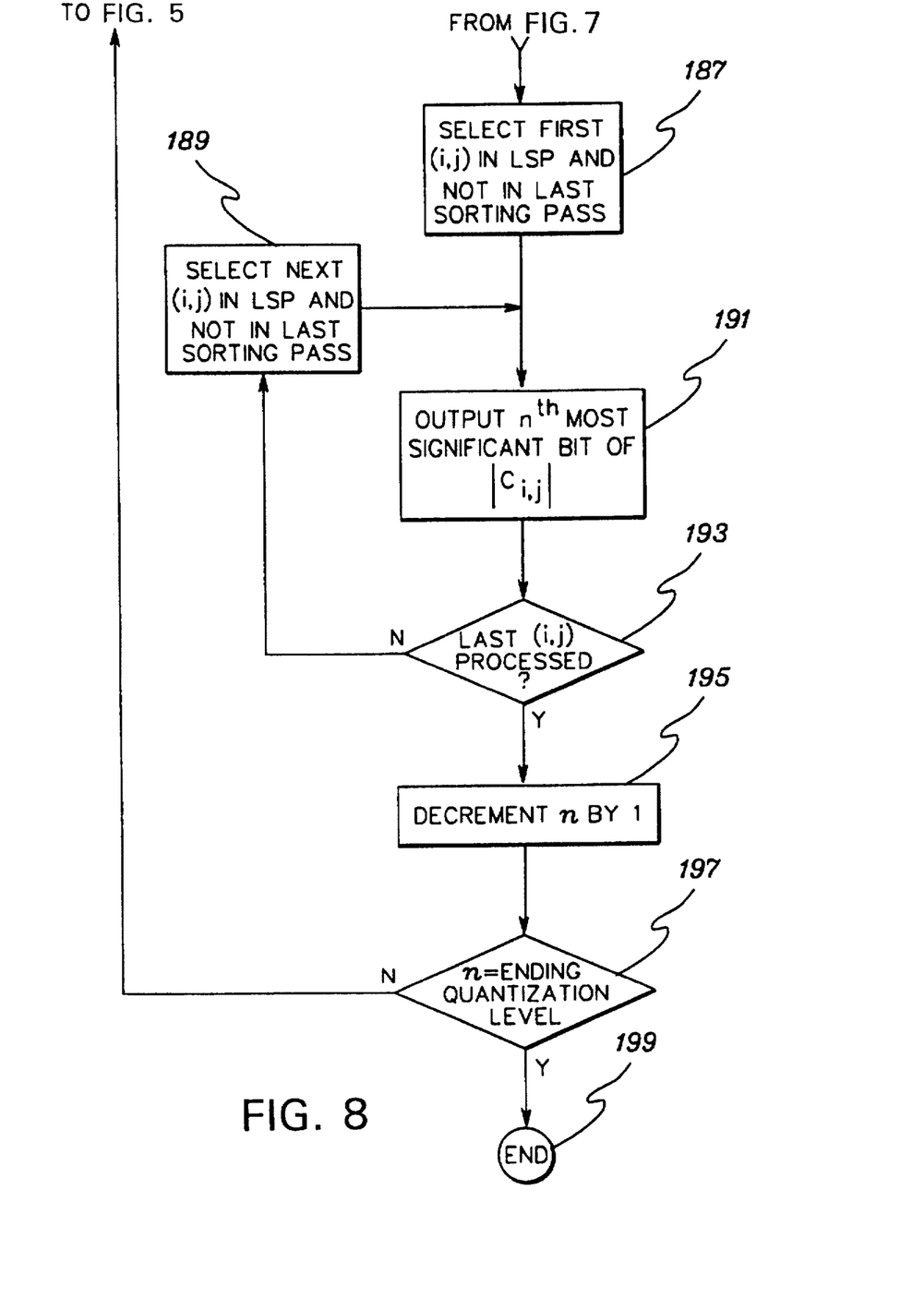

The refinement stage of the coding process is next performed (FIG. 8). During this stage, data is output for pixels in the LSP that were placed there during prior sorting passes (i.e., from previous quantization levels). Refinement begins with the selection of a first pixel (i,j) within the LSP that was not placed there during the immediately preceding sorting pass (187). The avoidance of those pixels placed on the LSP during the preceding sorting pass may be achieved by many programming techniques including, e.g., marking the end of the LSP prior to each sorting pass.

To continue, the $n^{th}$ (n=quantization level) most significant bit of the coefficient of the selected pixel ($c_{i,j}$) is output (191). A test is then performed to determine if the last pixel within the LSP has been processed (193), and if it has not, then the next pixel in the LSP is selected (189) and the process repeats.

The current quantization level is then decreased by one (195). If the ending quantization level has not yet been processed (197), then processing repeats beginning with the sorting phase (FIG. 5, step 131). Once processing of the ending quantization level has been completed, the process ends (199). The ending quantization level is predesigned to achieve a selected image quality/compression ratio.

In the above discussion, the specific order of processing the lists, LIP, LIS and then LSP, is chosen so that when processing terminates at any point prior to completion of a sorting pass at any quantization level, the coefficients just found to be significant at that level can be reconstructed approximately, because their significance data and signs have been outputted or inputted. In this way, the best reconstruction fidelity is obtained for any given compressed file size. If the order of processing the three lists is changed, the best reconstruction fidelity is obtained only at compressed file sizes corresponding to completion of processing all three lists LIP, LIS and LSP for a given quantization level n.

According to the techniques disclosed herein, branching conditions based on the significance data Sn that are calculated for $c_{i,j}$ are output into the compressed bit stream by the encoder. A decoding method is created by duplicating the encoder's execution path for sorting significant coefficients, but replacing each "output" with an "input." Whenever the decoder inputs data, its three control lists (LIS, LIP, and LSP) are identical to the ones used by the encoder at the moment it outputs that data. Thus, the decoder recovers the ordering from the execution path. The coding scheme of the present invention therefore results in an encoder and decoder that are symmetrical and have the same computational complexity.

In more specific regard to the decoder, an additional task performed thereby is to update the reconstructed image. For the value of n, when a coordinate is moved to the LSP, it is known that $2^n <= |c(i,j)| < 2^{n+1}$. So, the decoder uses that information, plus the sign bit that is input just after the insertion in the LSP, to set $\hat{c}_{i,j} = +-1.5 \times 2^n$. Similarly, during the refinement pass, the decoder adds or subtracts $2^{n-1}$ to $\hat{c}_{i,j}$ when it inputs the bits of the binary representation of $|c_{i,j}|$. In this manner the distortion gradually decreases during both the sorting and the refinement passes.

As with any other coding method, the efficiency of the encoder disclosed herein can be improved by entropy-coding its output, but at the expense of a larger encoding/decoding time. Practical experiments have shown that some improvements in performance are obtained by entropy-coding the coefficient signs and/or the bits put out during the refinement pass.

In another embodiment of the present invention, coding efficiency is enhanced by keeping groups of 2×2 coordinates together in the lists (LIS, LIP and LSP) and coding their significance values as a single symbol. In this group of four pixels, each one is significant if its coefficient is greater than or equal to the threshold, $2^n$. Since the decoder only needs to know the transition from insignificant to significant (the inverse is impossible), the amount of information that needs to be coded changes according to the number m of insignificant pixels in that group, and in each case it can be conveyed by an entropy-coding alphabet with $2^m$ symbols. With arithmetic coding it is straightforward to use several adaptive models, each with $2^m$ symbols, m∈{1, 2, 3, 4}, to code the information in a group of 4 pixels.

By coding the significance information together, the average bit rate corresponds to a $m^{th}$ order entropy. At the same time, by using different models for the different number of insignificant pixels, each adaptive model contains probabilities conditioned to the fact that a certain number of adjacent pixels are significant or insignificant. Accordingly, the dependence between magnitudes of adjacent pixels is fully exploited. This scheme is also useable to code the significance of trees rooted in groups of 2×2 pixels.

A particular data structure is useful in connection with representing groups of 2×2 pixels together in the lists of the present invention. The data structure of each tree node (i.e., group of 2×2 pixels) is represented by the following "C" programming code:

```
{
    int x,y;
    long state;
    Tree_Node * next;
};
```

The pair (x,y) contains the image coordinate of the upper-left pixel of the group. The pair (x,y) therefore represents the coordinates of an upper-left pixel of the group of four pixels. The pixels in the group are numbered as follows:

0 1
2 3

Thus, to obtain the coordinates of a pixel in the group, one of four pairs of values is added to (x,y). The four pairs comprise:

(0,0)—pixel 0
(1,0)—pixel 1
(0,1)—pixel 2
(1,1)—pixel 3

The variable 'state' contains significance data related to the set of four pixels and is used in the processing described herein. Specifically, 'state' contains significance data for the four pixels and for the four groups of descendants for the four pixels.

The even-numbered bits of 'state' indicate if the individual pixels of the group are significant, and the odd-numbered pixels indicate if the descendant sets are significant. Thus, if Pk is the significance value of pixel k (in the 2×2 block), and Sk is the significance value for the set descending from pixel k (the significance value of a set of four pixels is calculated using the arithmetic mean of the coefficients of the four pixels), then the 8 least significant bits of 'state' comprise:

S3 P3 S2 P2 S1 P1 S0 P0

For example, if the 8 least significant bits of 'state' comprise "0 0 1 0 0 1 0 0", then only the descendant set of pixel 2 and individual pixel 1 are significant. The other pixels and descendant sets are insignificant.

The above discussed 'state' variable is easily tested for conditions. For example, one test comprises the following "C" programming code:

if ((group→state & 0xAA==0) then . . .

In one statement, this test determines if all sets of descendants of the 2×2 group are insignificant ('group' is a pointer to a one tree node). According to the set decomposition scheme, if the result of this test is 'true', it means that the LIS entry is of type 'A'; otherwise it is of type 'B'.

The pointer 'next' in the data structure is used to create a dynamically allocated linked list. The entries are created when needed, and disposed of when not needed. Specifically, entries are created whenever a new set (tree) is added to the LIS and are deleted when, e.g., all bits within 'state' are set to one (i.e., all pixels in the set and their descendants are significant).

Although the techniques of the present invention have been described herein with respect to image processing, other forms of data may be processed. Any data set that may be transformed through subband decomposition may subsequently have the transform coefficients coded for transmission and/or storage using the disclosed techniques. For example, a digitized audio segment may be decomposed into frequency subbands and encoded as described herein. Furthermore, the coding techniques of the present invention may be applied to various types of subband decompositions with their associated filter, and to other linkages of pixel coefficients within these subbands.

Figure 9:
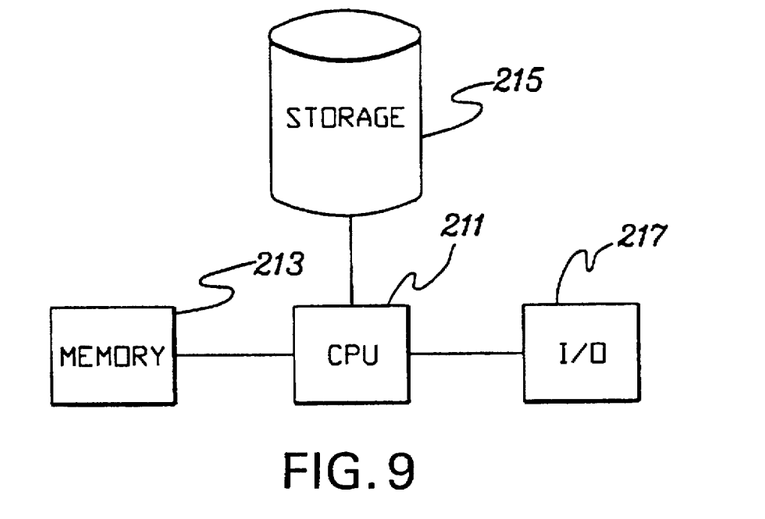
FIG. 9 is a block diagram of a computer system used in implementing the principles of the present invention.

The hardware elements of a design system used to implement the techniques of the present invention are shown in FIG. 9. A central processing unit ("CPU") 211 provides main processing functionality. A memory 213 is coupled to CPU 211 for providing operational storage of programs and data. Memory 213 may comprise, for example, random access memory ("RAM") or read only memory ("ROM"). Non-volatile storage of, for example, data files and programs is provided by a storage 215 that may comprise, for example, disk storage. Both memory 213 and storage 215 comprise a computer useable medium that may store computer program products in the form of computer readable program code. User input and output is provided by an input/output ("I/O") facility 217. I/O facility 217 may include, for example, a graphical display, a mouse and/or a graphics tablet. As an example, the design system of FIG. 9 may comprise an International Business Machines RISC System/6000 computer executing an AIX operating system.

The present invention has many advantages and features associated with it. The coding scheme of the present invention used to process a subband decomposition of a data set provides a high level of compression while maintaining a high computational efficiency. The transmitted code (i.e., compressed data set) is completely embedded, so that a single file for, e.g., an image at a given code rate can be truncated at various points and decoded to give a series of reconstructed images at lower rates. Processing may even be run to completion resulting in a near lossless (limited by the wavelet filters) compression. Further, the encoder and decoder use symmetrical techniques such that computational complexity is equivalent during both encoding and decoding. Thus, the techniques of the present invention advance the state of subband decomposition data compression techniques. The coding results are either comparable to, or surpass, previous results obtained through much more sophisticated and computationally complex methods.

The individual programming steps required to implement the techniques of the present invention will be apparent to one of ordinary skill in the art in view of the discussion presented herein.

While the invention has been described in detail herein, in accordance with certain preferred embodiments thereof, many modifications and changes therein may be affected by those skilled in the art. Accordingly, it is intended by the following claims to cover all such modifications and changes as fall within the true spirit and scope of the invention

We claim:

1. A method for use in encoding and decoding a subband decomposition of a data set, said method comprising the steps of:

(a) creating a list (LIS) consisting of insignificant sets of points, each set of said LIS being designated by a root node within said subband decomposition and having a corresponding tree structure of points within said subband decomposition, said corresponding tree structure of points being organized only as descendants and offspring of said root node and not including the root node, wherein a first generation of said descendants comprise said offspring;

(b) evaluating said descendants of said root node of each set of said LIS for significance, wherein a significant descendent of said descendants of said root node has a coefficient at least equal to a predetermined threshold;

(c) for each root node of said LIS having at least one significant descendant, evaluating descendants of said offspring of said root node for significance, wherein a significant descendant of said offspring of said root node has a coefficient at least equal to said predetermined threshold; and (d) if said root node has at least one significant descendant of offspring, then adding additional sets corresponding to each of said offspring of said root node to said LIS as a root node thereof.

2. The method of claim 1, wherein prior to said step (b), said method includes creating a list of significant points (LSP), said LSP initially comprising an empty set, and creating and keeping a list (LIP) consisting of individual insignificant points, said LIP initially comprising points from within a highest designated subband of said subband decomposition.

3. The method of claim 2, wherein prior to said step (b), said method includes one of outputting and inputting a significance value for each point within said LIP, said significance value indicating whether a coefficient of said point within said LIP is at least equal to said predetermined threshold.

4. The method of claim 3, wherein for each point in the LIP, after said one of outputting and inputting the significance value for the point within the LIP, if the coefficient of the point is at least equal to said predetermined threshold, moving the point from the LIP to the LSP and one of outputting and inputting a sign of the coefficient of the point.

5. The method of claim 2, wherein prior to said step (c) for each root node of said LIS having at least one significant descendant, evaluating said offspring of said root node for significance, wherein a significant offspring has a coefficient at least equal to said predetermined threshold, and one of immediately outputting and inputting a significance value for each offspring of said root node, said significance value indicating whether said offspring is significant.

6. The method of claim 5, further comprising, for each significant offspring of said root node, adding said significant offspring to said LSP and one of outputting and inputting a sign of the coefficient of said significant offspring.

7. The method of claim 5, wherein an insignificant offspring of said root node has said coefficient less than said predetermined threshold, and wherein said method further comprises, for each insignificant offspring of said root node, adding said insignificant offspring to said LIP.

8. The method of claim 1, wherein each set of said LIS has a set type identifier comprising one of a type A and a type B, said type A designating said set as all descendants of the root node of said set, said type B designating said set as all of the descendants of the root node of said set excluding the offspring of said root node, and wherein said step (a) includes designating each set of said LIS as said type A.

9. The method of claim 8, wherein said step (d) comprises, if said root node has at least one significant descendant of offspring, adding each offspring of said root node to said LIS as a root node thereof, said offspring having said type A set type identifier corresponding thereto within said LIS.

10. The method of claim 9, wherein said step (d) further comprises, if said root node has at least one significant descendant of offspring, removing said root node from said LIS.

11. The method of claim 8, wherein said step (c) comprises, for each root node of said LIS having at least one significant descendant of offspring, changing said set type identifier of the set comprising said root node to said type B.

12. The method of claim 11, wherein said step (d) comprises, for each set within said LIS comprising said type B, outputting a significance indicator corresponding to said set, said significance indicator indicating whether a coefficient of any point within said set is at least equal to said predetermined threshold.

13. A computer program comprising a computer useable medium having computer readable program code therein for use in encoding and decoding a subband decomposition of a data set, said computer readable program code in said computer program comprising:

first computer readable program code for causing a computer to affect creating a list (LIS) consisting of insignificant sets of points, each set of said LIS being designate by a root node within said subband decomposition and having a corresponding tree structure of points within said subband decomposition, said corresponding tree structure being organized only as descendants and offspring of said root node and not including said root node, wherein a first generally of said descendants comprise said offspring;

second computer readable program code for causing a computer to affect evaluating said descendants of said root node of each set of said LIS for significance, wherein a significant descendent of said descendants of said root node has a coefficient at least equal to said predetermined threshold;

third computer readable program code for causing a computer to affect for each root node of said LIS having at least one significant descendant, evaluating descendants of said offspring of said root node for significance, wherein a significant descendant of said offspring of said root node has a coefficient at least equal to said predetermined threshold; and fourth computer readable program code for causing a computer to affect adding additional sets corresponding to each of said offspring of said root node to said LIS as a root node thereof when said root node has at least one significant descendant of offspring.

* * * * *